United States Patent Office 2,889,631
Patented June 9, 1959

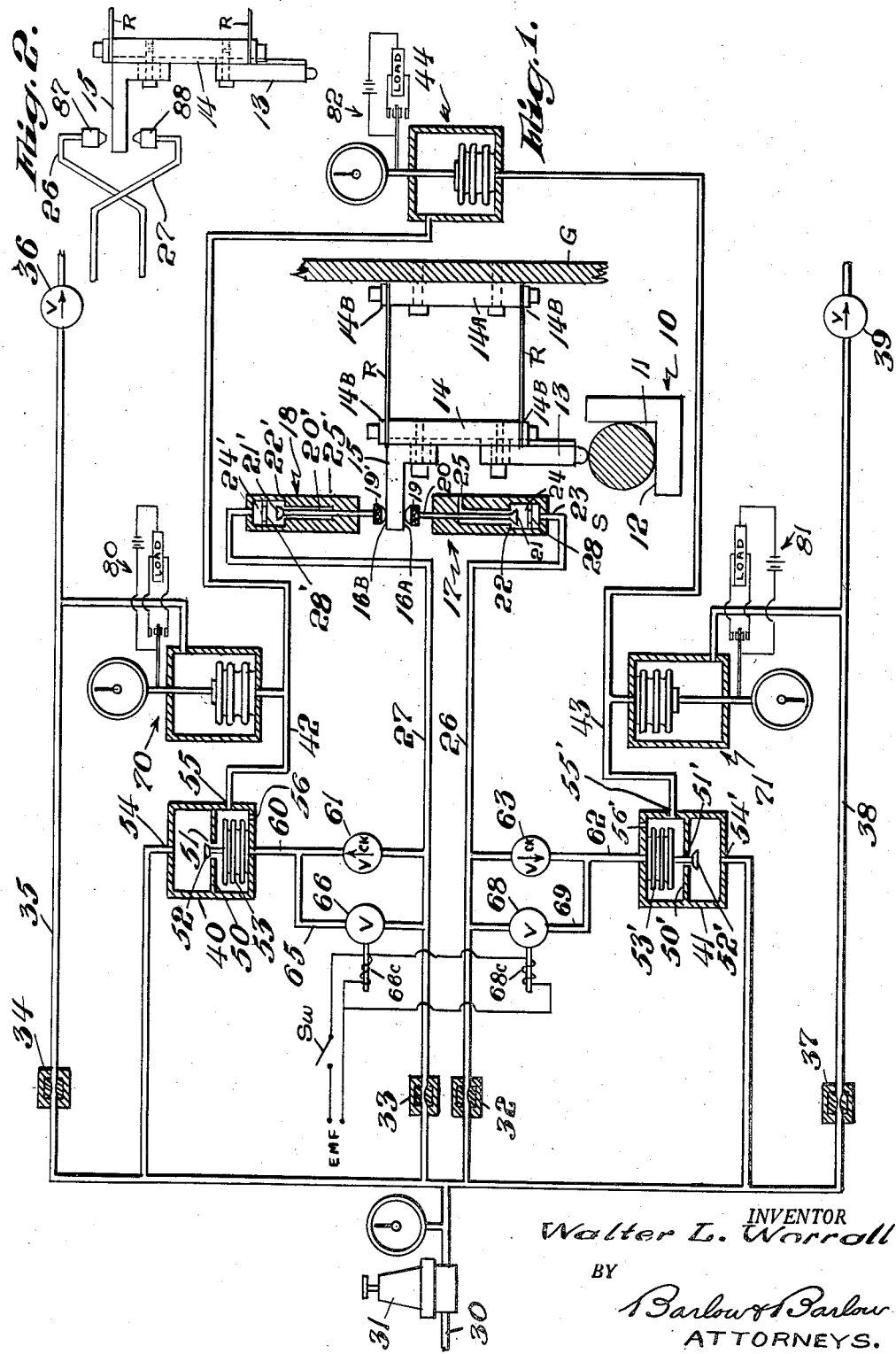

2,889,631
GAUGING APPARATUS

Walter L. Worrall, Barrington, R.I., assignor to Federal Products Corporation, a corporation of Rhode Island Application June 26, 1958, Serial No. 744,746

5 Claims. (Cl. 33—147)

The invention relates broadly to gauging apparatus and more specifically to a gauging apparatus which is specifically adapted to compare a dimension of a plurality of objects against a standard.

As one particular example of a use for such a device, let us assume that the dimensions of a cylindrical object, such as a bearing outer race, is to be measured by comparison to a master part of known size. It has become common in the industry to specify that maximum diameter of an outer race be within certain set limits, that the minimum diameter be within certain other limits and that the difference between standard size and one half the sum of the maximum and minimum diameter be within a third set of limits.

It becomes apparent, therefore, that it is desirable to have an instrument which will not only locate, measure and remember a minimum dimension but also locate, measure and remember a maximum dimension in relation to a standard size and to measure the difference between standard size and the average (one half the sum) of the maximum and minimum size. The sum should also be remembered. The apparatus should also be capable of determining whether each of the three remembered values was above, between or below its respective pre-set limits, and furnish a corresponding signal automatically.

In the drawing:

Figure 1 represents a schematic diagram of a gauging apparatus assembled in accordance with the invention; and Figure 2 is a modification that may be made thereto.

In proceeding with this invention, I take a right angular reference contact which will abut the object to be measured in two planes at right angles to each other and parallel to its axis. In association with this fixed contact a feeler device is utilized. The feeler device comprises a reed mounted plate with freedom of motion in a vertical direction only, while maintaining planar parallelism with the vertical surface on the fixed right angle contact.

On the spring mounted plate is situated a sensitive contact which is adapted to move in a path perpendicular to the horizontal surface of the right angle fixed contact. This sensitive contact senses the position of the upper cylindrical surface of the part and hence its diameter. Also mounted on the spring mounted plate is a right angle bracket, the purpose of which is to transfer the motion of the sensitive contact to two sensing elements or pneumatic transducers. These transducers can be used in conjunction with a pneumatic gauging system to accomplish the results enumerated above.

Referring now more particularly to the drawings, we have shown therein a right angle reference contact 10, having faces 11 and 12 disposed in planes at right angles to each other. In the V formed by the faces 11 and 12, a cylindrical object S may be placed.

A measuring contact in the form of a probe 13 is mounted in a recess of plate 14 of a pantograph for contact with the object S. The pantograph plate 14 moves in a path parallel to the plane of surface 11 which action is secured by mounting the plate 14 to a second fixed plate 14A by at least a pair of reeds or flat springs R securely fastened as by blocks 14B to the plates 14, 14A. Plate 14A is in turn fastened to a supporting structure G which by design is parallel to the plane of surface 11. Accordingly if all the faces of plates 14, 14A form a true rectangle, the probe 13 will move in the proper path. To transfer the motion of probe 13 to measuring means, a right angular member 15 is secured in a recess of plate 14 and has two parallel faces 16A and 16B which contact, respectively, sensing means generally designated 17 and 18. In Figure 1, the sensing units 17 and 18 are mechanical air transducers which are in fact variable valve arrangements to vary the escape of air therethrough in response to the movement of a feeler. For example, the air transducer 17 is provided with a feeler 19 that is connected via a stem 20 to a conical plug 21. The conical plug 21 is in effect a valve plug which is associated with a seat 22 received in the body of the air transducer 17. Thus, when air pressure is applied as at 23 to the bore 24 in the air transducer 17 and the movement of the plug 21 is controlled by the feeler 19, the amount of air escaping from port 25 may be controlled. Accordingly if a regulated air supply is applied to the transducers 17 and 18 through individual restricting jets, it will be apparent that the pressure in a line such as 26 will vary in direct proportion to the amount of movement of the feeler 19.

Accordingly, a suitable air supply is applied to the measuring system as at 30 through a suitable pressure regulator 31 and restricting jets 32, 33 to the air transducers 17 and 18 respectively via air lines 26 and 27. Additionally, this air pressure is supplied through another restricting jet 34 to a branch 35 having at the end thereof a zero setting valve 36. Similarly, through another equalizing jet 37, air is supplied to a branch line 38 which terminates in a zero setting valve 39. In addition the air is supplied to air relays 40 and 41 which are in effect pneumatic boosters. The output of the air relays 40 and 41 respectively is fed by conduits 42, 43 to a differential meter generally indicated at 44.

The air relay or pneumatic boosters 40 and 41 are identical and only booster 40 will be described, like numerals with a prime being applied to booster 41. Booster 40 consists of a casing having its body generally divided by a plate such as 50. The plate 50 is apertured as at 51 and receives therein a valve plug 52. The valve plug 52 is mechanically coupled to a bellows chamber 53, there being an air input to the relay as at 54 and an output as at 55 with a leak hole 56 to insure a continual flow of air through the unit. It would be apparent to those skilled in the art that movement of the valve plug 52 will vary the amount of air passing through the air relay unit and consequently the pressure in the output line 42. To vary the pressure in the line 42, the bellows 53 of relay 40 is connected via a conduit 60, through a sensitive check valve 61 to the branch line 27. Similarly, the bellows 53' of the air relay 41 is connected via conduit 62 and a sensitive check valve 63 to conduit 26. Accordingly, it would be apparent that the pressure in the lines 60 or 62 will control the amount of air allowed to pass through the valve of air relays 40 and 41, and the presence of check valves 61 and 63 will maintain in bellows 53 and 53' the maximum reached pressure in lines 26 and 27. Additionally, the presence of the leak holes 56 and 56' allow the pressures in lines 42 and 43 to fall, which would not be possible in a "tight" system.

In the particular arrangement described the leak holes 56 and 56' are necessary if one wants to duplicate a pneumatic pressure which is being sensed. For example, let it be assumed that the pressure within the bellows 53 and in the space surrounding the bellows below the plate 50 is equal. Now when the pressure in the bellows 53 drops below the pressure in the surrounding area, the valve plug 52 will tend to return to its seat at 51 which action will restrict, if not prevent, the entry of air from the chamber above the plate 50. Accordingly, since the only outlet from the chamber below the plate 50 is to an air-type meter such as 44 which effectively forms a blind end, there is no place for the air trapped in the space below the plate 50 to go unless there was provided a leak hole such as 56. Accordingly in actual practice the supply air from the input at 54 is sufficient to offset any leak provided through the hole 56.

For re-set purposes, which will be presently described, there is provided a by-pass line around each of the check valves 61 and 63, designated respectively 65 and 69, each having in circuit therewith a solenoid valve designated 66 and 68 respectively having operating coils 66C, 68C which are connected through switch Sw to a suitable source of voltage, that is labeled E.M.F. The solenoid valve 66 is of the normally closed type as is the solenoid valve 68.

In order to appreciate now how these various parts are inter-related one to the other and how the entire system operates to produce the results of the objects as set forth above, let us assume that an object to be gauged is placed on the reference contact generally designated 10. Let us further assume that the object that is placed on this contact is what is known in the industry as a master, that is, it is a piece which has been machined to a definite size. With this master piece in place the switch S is closed thereby opening the solenoid valves 66 and 68. This then places in lines 60 and 62 pressures equal to the pressures existing in lines 27 and 26 respectively. It will be understood that the valves 52 and 52' are accordingly opened a certain finite amount and in turn a certain pressure depending upon this degree of opening is existent in lines 42 and 43. The stems 20 and 20' of the transducers 17 and 18 are now manually moved so that the plugs 21 and 21' are moved within mastering rings 28, 28' to permit a preset escape of air and valves 36 and 39 are adjusted so that the dials of gauges 70 and 71 read "zero" which in actuality is a finite pressure. Feelers 19 and 19' are returned to surfaces 16A, 16B and the position of transducers 17 and 18 is adjusted to repeat the "zero" reading on gauges 70 and 71 which means that the same amount of air is escaping through the transducers as occurred in the mastering ring position. This operation insures that the transducers 17 and 18 are positioned in an operating range. Then the dial of gauge 44 may be set so that it is "zeroed" which may be easily effected by attaching the dial face to a rotatable bezel. The system is now set to the master by the positioning of the probes and zeroing of the gauges.

Another piece is placed in the reference contact 10 which may be the piece upon which the measurement information is desired and a pressure is established in lines 60 and 62 and in the bellows 53, 53' which is less than or equal to the final pressure. At this point in the example being described, solenoid valves 66 and 68 are still open and differential meter 44 will indicate, when a uncompensated dial is used, twice the difference between the measured diameter and the master size. In practice, however, a compensated dial is used so that the indication shows the difference between the measured diameter and the master size. It should also be noted that while valves 66 and 68 are open, gauges 70 and 71 will indicate the amount the piece is off size at that particular measured diameter.

Now if solenoid valves 66 and 68 are closed and the test piece is rotated, there will be obtained a relationship between the mean diameter of the test piece and the master diameter. This comes about since a maximum pressure is built up in the bellows 53 of relay 40 representing the minimum diameter of the test piece while a maximum pressure is built up in the bellows 53' of relay 41 representing the maximum diameter of the test piece. The pressure changes in bellows 53 and 53' are reflected in lines 42 and 43 respectively and the difference in the pressures existent in these lines is reflected in meter 44. As mentioned above, however, the actual dial on meter 44 is compensated so that the reading obtained is actually one half the sum of the maximum and minimum diameters or equal to the mean diameter of the test piece.

During the measurement procedure briefly outlined above, the various parts of the system function as follows. When a maximum diameter occurs at a certain instant, it will be apparent that the stem 20 of the valve 17 will move upwardly as viewed in the drawing thereby bringing the valve plug 21 into closer association with the valve seat 22. This action will raise the pressure in line 26 and the incremental amount of this raised pressure will be passed by check valve 63 into bellows 53'. This raised pressure will be maintained in the system because of the check valve 63 whose purpose in the system is to retain the highest pressure in line 62 that is found at the inlet end thereof. It will accordingly follow that, with the increased pressure in the bellows 53', a proportional pressure increase will occur in the line 43 and in the bellows of differential meter 44 to be indicated on meter 71. When the maximum diameter is reached, there will be actually no effect on the other portion of the air system as represented and controlled by the valve 18. This comes about because, when the maximum diameter or maximum measurement as the case might be is reached, the stem 20' of valve 18 will move upwardly as viewed in the drawing thereby raising the valve plug 21' from its seat 22' and accordingly more air is allowed to escape through the exit port 25'. This will reduce the pressure in line 27 and, of course, a reduced pressure will have absolutely no effect on the pressure in the line 60 and, of course, in the bellows 53. Similarly, but conversely, if a minimum diameter or measurement is reached, then the valve plug 21 will tend to move to the closed position raising the pressure in line 27 which raised pressure will be passed by check valve 61 into line 60 and to bellows 53. As in the other case, the increased pressure will be reflected in line 42 indicated on meter 70 and passed to the other side of the bellows of differential meter 44. Accordingly, the differential meter represents the pressure difference in the two pressures applied to the two sides thereof. In other words, if one side is 30 lbs. and the other side is 31 lbs., the same reading will be obtained as if one side were 29 lbs. and the other side were 30 lbs.

Let us now look at the relationship of the movement of probes 17 and 18 to the readings obtained. If we say that $A+B=A-(-B)$, we may see mathematically the relationship of the probe action to the pressure readings obtained in this system. The additional minus sign comes about due to the reversal of travel of one of the probes as compared to the other. Therefore, the comparison between the two pressures or the difference between the two pressures as registered in the meter 44 represents the difference between the size of the master and the sum (or one-half the sum with a compensated dial) of the maximum and minimum diameters. Accordingly, what in effect is happening is that this particular device is measuring the maximum excursions of the two transducers and retaining that measurement through the utilization of check valves 61 and 63. Thus a maximum pressure is effectively built up in one transducer and a maximum pressure in another transducer. In any one position both transducers must be at maximum pressure or below by the very definition of the operation of this system and in one revolution of the test piece both probes "effectively" (through their associated measuring apparatus) stabilize at maximum pressure.

To further clarify the operation of the system, let us examine the mathematical relationships.

Let the pressure in line 42 be $P_1$ and in line 43 be $P_2$ then:

$$P_1 = P_n + k(D_n - D_{min})$$
$$P_2 = P_n + k(D_{max} - D_n)$$

where $P_n$ is the static pressure in the lines with the master piece and $D_n$ is the master diameter.

The reading on meter 44 equals $P_1 - P_2$ which by substitution becomes:

$$P_n + k(D_n - D_{min}) - [P_n + k(D_{max} - D_n)]$$

simplifying the expression this becomes $$2kD_n - 2k\left(\frac{D_{min} + D_{max}}{2}\right)$$

or $$P_1 - P_2 = 2k\left(D_n - \frac{D_{min} + D_{max}}{2}\right)$$

It will be apparent that it is desirable to make the gauge automatic in the sense that the pressures obtained may operate some load device either to indicate to the operator that a piece is within or out of limits or to actuate a reject means. To this end switch means 80, 81 and 82 which each consist basically of a single pole double throw switch may be coupled to the actuating stems of meters 70, 71 and 44 respectively. These switches actuate load means, as indicated in the drawing, which can take the form of a reject trap door, indicator lights, etc., and have contacts which are set to close when the measurement being sensed exceeds in either direction the desired dimensions. For instance, meter 71 provides a remembrance of the maximum size measured, that is, it indicates the maximum excursion in the positive direction while meter 70 is concerned with the minimum or negative excursion, and meter 44 with the average. Thus, three sets of conditions may be sensed and operate a reject indicator or means if the proper range is not found.

Referring now to Figure 2, there is shown an alternate arrangement for transferring the mechanical measurement to the air system. In this arrangement the transducers 17 and 18 are replaced by air nozzles 87, 88 which are mounted so that the outlet jets direct air against opposite face surfaces of member 15. It will be remembered that in the mechanical transducer arrangement, valve 17 effectively measured a maximum size by building up a maximum pressure in relay 41 while valve 18 measured minimum size by building up a maximum pressure in relay 40. Accordingly, in order to maintain this condition in the alternate arrangement of Figure 2, nozzles 87 and 88 (corresponding respectively to transducers 17 and 18) are arranged to produce this result and may be considered as transposed from the respective corresponding unit. Such a change is necessary, for as known in the art, line pressure to a nozzle rises when the nozzle approaches a surface while the reverse is true of the transducers illustrated in Figure 1. The end result, when adjusted as previously described, is identical and reference may therefore be made to that described above for operational details.

It will also be apparent that certain other refinements may be made to the disclosed apparatus and it is to be understood that the drawing is purely schematic, the physical components illustrated being greatly refined from the simple showing herein.

I claim:

1. A pneumatic gauging apparatus for comparing a dimension of an object against a standard comprising two transducers adapted to be coupled to the object, one transducer being arranged to produce a maximum line pressure upon a maximum measurement and the other transducer being arranged to produce a maximum line pressure upon a minimum measurement, each transducer being connected through a separate line and a restricting jet to a source of air pressure, two pressure sensing devices, one device connected through a check valve to one line, the other of said devices connected through another check valve to the other line, and differential meter means coupled to said sensing devices.

2. An apparatus as in claim 1 wherein a by-pass valve is connected in parallel with each check valve.

3. A pneumatic gauging apparatus for comparing a dimension of an object against a standard comprising a source of air pressure, a first restricting jet connected to said source and to an air transducer, a second restricting jet connected to said source and to a second air transducer, means coupling said transducers to an object to be measured so that one transducer will produce a maximum input pressure upon a minimum measurement and the second transducer will produce a maximum input pressure upon a maximum measurement, means for connecting the inputs of each transducer to separate inputs of a differential meter, said last named means including means to maintain a maximum sensed pressure so that said differential meter will indicate an average of the maximum and minimum observed measurements of an object coupled to said air transducers.

4. An apparatus as in claim 3 wherein the first named means includes a reference contact and a probe, said probe mounted for relative movement with respect to the reference contact by reeds to secure single axis movement of said probe in a plane normal to said reference contact, said probe having connected thereto a right-angular piece for direct contact with said air transducers.

5. A pneumatic gauging apparatus as in claim 3 wherein a means to maintain a maximum pressure includes a check valve between each transducer and the differential meter.

References Cited in the file of this patent
UNITED STATES PATENTS

| | | |
|---|---|---|
| 2,374,154 | Moore | Apr. 17, 1945 |
| 2,399,305 | Agnew et al. | Apr. 30, 1946 |
| 2,478,391 | Segerstad | Aug. 9, 1949 |